US012632173B2

(12) United States Patent
Sabesan et al.

(10) Patent No.: US 12,632,173 B2
(45) Date of Patent: May 19, 2026

(54) LOGICAL BLOCK ADDRESS LEVEL DATA PROTECTION SCHEME

(71) Applicant: Sandisk Technologies, Inc., Milpitas, CA (US)

(72) Inventors: Sridhar Sabesan, Bangalore (IN); Pavan Gururaj, Bangalore (IN); Dinesh Babu, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/774,531

(22) Filed: Jul. 16, 2024

(65) Prior Publication Data

US 2026/0023481 A1     Jan. 22, 2026

(51) Int. Cl.
  *G06F 3/06* (2006.01)
  *G06F 11/14* (2006.01)

(52) U.S. Cl.
  CPC .......... *G06F 3/0604* (2013.01); *G06F 3/0655* (2013.01); *G06F 3/0679* (2013.01); *G06F 11/1417* (2013.01)

(58) Field of Classification Search
  CPC ..... G06F 3/0604; G06F 3/0655; G06F 3/0679
  See application file for complete search history.

(56) References Cited

U.S. PATENT DOCUMENTS

| | | | | | |
|---|---|---|---|---|---|
| 6,425,052 | B1 * | 7/2002 | Hashemi | ............... | G06F 3/0689 |
| | | | | | 711/114 |
| 7,340,581 | B2 | 3/2008 | Gorobets et al. | | |

| | | | | | |
|---|---|---|---|---|---|
| 10,565,051 | B2 | 2/2020 | Li | | |
| 10,884,857 | B2 | 1/2021 | Kumar et al. | | |
| 10,942,654 | B2 | 3/2021 | Meiri et al. | | |
| 11,023,388 | B2 | 6/2021 | Novogran et al. | | |
| 11,132,256 | B2 | 9/2021 | Roberts | | |
| 11,221,958 | B2 | 1/2022 | Choi et al. | | |
| 11,237,977 | B2 | 2/2022 | Choi et al. | | |
| 11,789,873 | B2 | 10/2023 | Choi et al. | | |
| 2019/0065389 | A1 * | 2/2019 | Choi | ........................ | G06F 3/065 |
| 2019/0087605 | A1 * | 3/2019 | Jensen | .................. | H04L 9/0825 |
| 2023/0052161 | A1 * | 2/2023 | Seok | ................... | G11C 11/5642 |
| 2023/0350752 | A1 * | 11/2023 | Alkalay | .............. | G06F 9/30029 |

(Continued)

FOREIGN PATENT DOCUMENTS

| | | | | | |
|---|---|---|---|---|---|
| EP | 1168173 | A2 * | 1/2002 | .......... | G06F 11/1076 |

*Primary Examiner* — Edward J Dudek, Jr.
(74) *Attorney, Agent, or Firm* — DENTONS Durham Jones Pinegar

(57) ABSTRACT

A data storage device includes a data protection system that protects data on a logical block address (LBA) level. In one implementation, the data protection system populates and maintains a global parity mesh table. The global parity mesh table includes parity information associated with a group of two LBAs. If data associated with one of the LBAs in the group becomes corrupted, the parity information in the global parity mesh table is used, in conjunction with data stored in the non-corrupted LBA, to recover the data associated with the corrupted LBA. In another implementation, the data protection system stores multiple copies of parity information in different sections or portions of two or more associated LBAs. If data associated with one LBA becomes corrupted, the data is recoverable using one of the copies of parity information stored in at least one or more of the associated LBAs.

20 Claims, 10 Drawing Sheets

(56)    References Cited

U.S. PATENT DOCUMENTS

| | | | |
|---|---|---|---|
| 2024/0069751 A1* | 2/2024 | Eun | G06F 3/0619 |
| 2024/0232009 A1* | 7/2024 | Rai | G06F 11/108 |
| 2024/0248793 A1* | 7/2024 | Xu | G06F 11/1004 |
| 2024/0256123 A1* | 8/2024 | Moore | G06F 3/065 |
| 2024/0345734 A1* | 10/2024 | Hiwada | G06F 3/0611 |

* cited by examiner

500

RECEIVE DATA FROM HOST DEVICE ~510

WRITE DATA TO FIRST LBA ~520

WRITE DATA TO SECOND LBA ~530

GROUP FIRST LBA AND SECOND LBA ~540

CALCULATE PARITY INFORMATION FOR FIRST LBA AND SECOND LBA ~550

STORE PARITY INFORMATION IN GLOBAL PARITY MESH TABLE ~560

600

800

LOGICAL BLOCK ADDRESS LEVEL DATA PROTECTION SCHEME

BACKGROUND

When data is stored by a data storage device, there is a risk that the data will become lost or corrupted. As such, data recovery is an important aspect of all data storage devices.

In order to recover corrupted data, some data storage devices implement a redundant array of independent dies (RAID) storage scheme which is aimed at handling errors that occur as a result of physical defects. In a RAID storage scheme, data, along with first parity information and second parity information, is distributed in a stripe across multiple different solid state drives (SSDs), hard disk drives (HDDs), other storage media or across multiple different memory dies in a single SSD. The parity information enables recovery of the data in the stripe should one of the SSDs, HDDs or memory dies fail.

In another example, a data storage device may implement an erasure coding storage scheme. In an erasure coding storage scheme, data is broken into various fragments or data blocks. Additional fragments, known as parity blocks or parity fragments, are also created and can be used for data recovery. The initial fragments, and the additional fragments, are stored across a number of different locations or data storage devices. Should a data storage device fail or become corrupted, the data can be reconstructed from the additional fragments.

However, some data storage devices, typically lower cost data storage devices, do not implement RAID or erasure coding storage schemes. If data on these data storage devices becomes corrupted, third-party data recovery software or a data recovery vendor can be used to recover the data. However, these methods of data recovery are not always successful.

Accordingly, it would be beneficial for a data storage device to have robust data correction capabilities without using RAID or erasure coding storage schemes and without the need for third party software or vendors.

SUMMARY

The present disclosure describes a data storage device having a data protection system. In an example, the data protection system protects data on a logical block address (LBA) level without the drawbacks of a traditional RAID storage scheme or an erasure coding storage scheme. The data protection system populates and maintains a global parity mesh table that includes parity information associated with each LBA.

For example, when data is written to at least two associated LBAs (or to physical locations in the data storage device associated with the at least two LBAs), the data protection system calculates parity information (or hashing/parity information) for the data stored by the LBAs. The parity information is then stored in a global parity mesh table. If data associated with one of the LBAs become corrupted, the parity information (or the hashing/parity information) in the global parity mesh table is used, in conjunction with data stored in the non-corrupted LBA, to recover the data associated with the corrupted LBA.

In an example, the global parity mesh table is stored (or is storable) at a number of different locations. For example, the global parity mesh table is stored by the data storage device itself. In another example, the global parity mesh table is stored in a conventional magnetic recording (CMR)

drive and/or a shingled magnetic recording (SMR) drive. In yet another example, the global parity mesh table is remotely stored (e.g., by a host device), is stored externally in a controller memory buffer (CMB), is stored in a host memory buffer (HMB) and/or is stored in compute express link (CXL) environment.

In another example, the data protection system stores multiple copies of parity information (or hashing/parity information) in different sections or portions of two or more associated LBAs. For example, when data is written to a first LBA, the data protection system calculates parity information associated with the data. A first copy of the parity information is stored in a first section of a second LBA that is associated with the first LBA and a second copy of the parity information is stored in a second of a third LBA that is associated with the first LBA. For example, a first copy of the parity information is stored in a second section of a first LBA (or N−2 from the third LBA or N−1 from second LBA that is associated with the N and N+1 LBA or a second and a third LBA) and a second copy of the parity information is stored in a first section of the third LBA (or the Nth LBA or N+1 from the second LBA.)

If the first LBA becomes corrupted (or data associated with the first LBA becomes corrupted), the data is recoverable using at least one of the first copy of the parity information and/or using the second copy of the parity information.

Accordingly, examples of the present disclosure describe a method that includes receiving first data from a host device and associating a first logical block address (LBA) with the first data. The first data is stored at a first physical location in a data storage device associated with the first LBA. The method also includes receiving second data from the host device and associating a second LBA with the second data. The second data is stored at a second physical location in the data storage device associated with the second LBA. The first LBA is associated with the second LBA to create a LBA group. Based, at least in part, on associating the first LBA with the second LBA, data recovery information associated with the first LBA and the second LBA is determined. In an example, the data recovery information is based, at least in part, on the first data and the second data. The data recovery information is associated with the LBA group and the data recovery information and the associated LBA group is stored.

Other examples describe a method that includes receiving data from a host device and associating a first logical block address (LBA) with the data. The data is stored at a first physical location in a data storage device associated with the first LBA. In an example, the first physical location is divided into a data section, a first data recovery section and a second data recovery section. Data recovery information associated with the data is also determined. The method also includes identifying a second LBA associated with the first LBA. In an example, the second LBA is associated with a second physical location in the data storage device and is divided into a data section, a first data recovery section and a second data recovery section. A first copy of the data recovery information associated with the data is stored in at least one of the first data recovery section and the second data recovery section associated with the second LBA.

The present disclosure also describes a data storage device that includes a means for storing data at a first physical location associated with a first logical block address (LBA). In an example, the first physical location includes a data section, a first data recovery section and a second data recovery section. The data storage device also includes a means for determining data recovery information associated with the data. The data storage device also includes a means for identifying a second LBA associated with the first LBA. In an example, the second LBA is associated with a second physical location and includes a data section, a first data recovery section and a second data recovery section. The data storage device also includes a means for storing a first copy of the data recovery information associated with the data in at least one of the first data recovery section and the second data recovery section associated with the second LBA.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
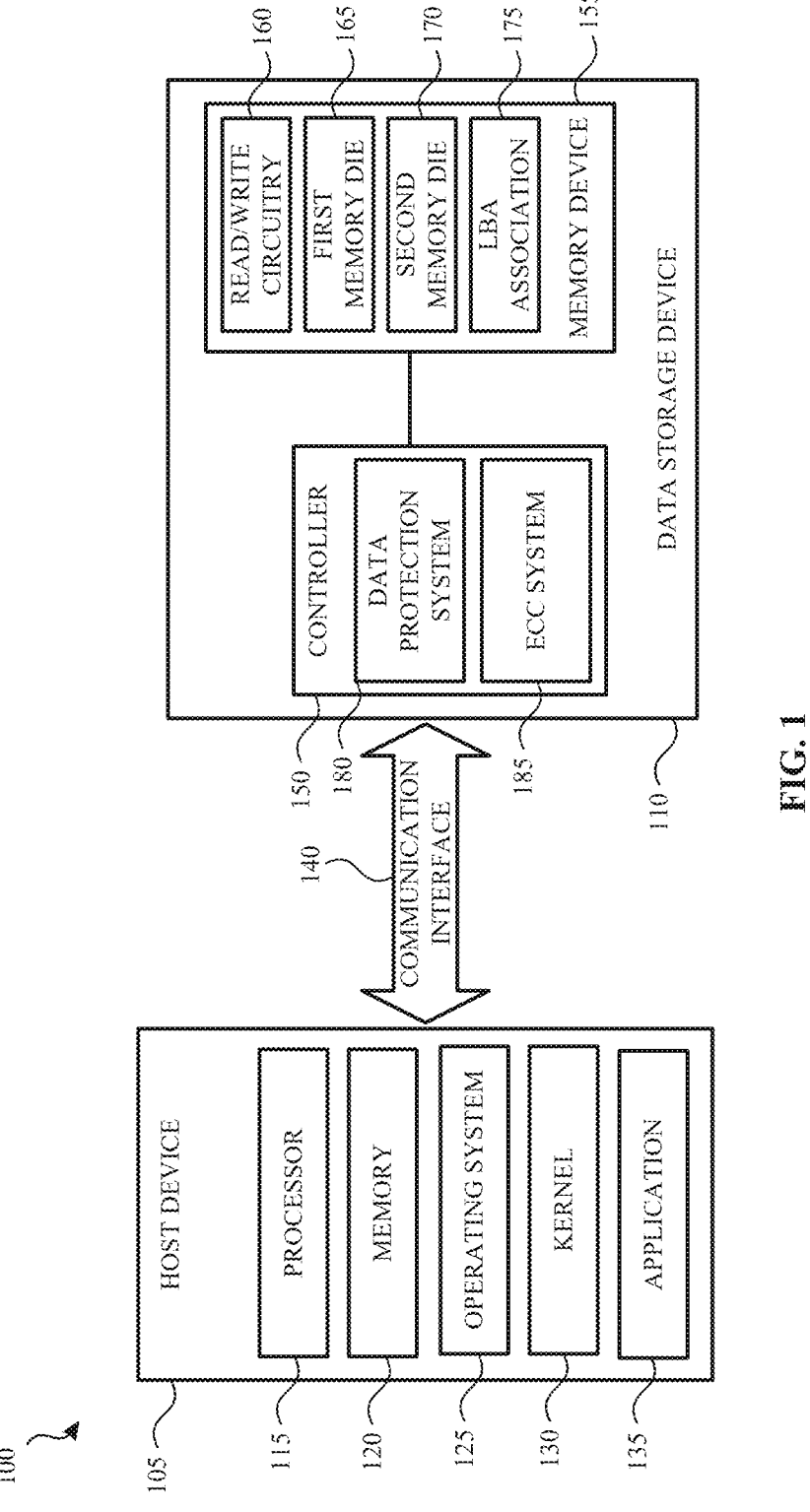
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

As previously discussed, data recovery is an important aspect of all data storage devices. As such, data storage devices implement a number of different data storage schemes to recover corrupted data. For example, some data storage devices implement a redundant array of independent dies (RAID) storage scheme which is aimed at handling errors that occur as a result of physical defects. In a RAID storage scheme, data, along with first parity information and second parity information, is distributed in a stripe across multiple different solid state drives (SSDs), hard disk drives (HDDs), other storage media or across multiple different memory dies in a single SSD. The parity information enables recovery of the data in the stripe should one of the SSDs or memory dies fail.

However, the RAID storage scheme has some drawbacks. One drawback is that data storage devices that are included in a RAID storage scheme are underutilized if partial volumes are created. For example, if a RAID storage scheme utilizes three data storage devices and if the data storage devices have different capacities (e.g., the first data storage device is 6 TB, the second data storage device is 8 TB and the third data storage device is 10 TB), the smallest capacity data storage device (e.g., the 6 TB data storage device) would be the capacity limit for the second data storage device and the third data storage device.

In this example, 12 TB of storage would be available to store data and 6 TB would be used for parity information. The remaining 6 TB of capacity (2 TB from the second data storage device and 4 TB from the third data storage device) would never be utilized.

Another drawback of a RAID storage scheme is that a data storage device cannot be used in both a RAID storage scheme implementation and a non-RAID storage scheme implementation. For example, a data storage device that is included in a RAID storage scheme cannot be used in any non-RAID environment if any capacity is purposefully left out during RAID creation.

For example, if a system has three data storage devices and each data storage device has 6 TB of capacity, a RAID storage scheme implementation may be implemented in which 4 TB of capacity from each drive is utilized. As a result, 8 TB would be used for data storage and 4 TB would be used to store parity information. However, the remaining 2 TB of each data storage device (for a total of 6 TB) cannot be leveraged for non-RAID purposes.

To address these drawbacks, and to provide other benefits, the present disclosure describes a data protection system for a data storage device that removes fixed barriers of RAID creation and makes it flexible. For example, the present disclosure provides data redundancy for data recovery without the drawbacks of a RAID-based system.

In an example and as will be described in greater detail herein, the data protection system protects data on a logical block address (LBA) level. For example, the data protection system populates and maintains a global parity mesh table that includes parity information associated with each LBA.

When data is received (e.g., from a host device), the data is written to at least two associated LBAs (or to physical locations in the data storage device associated with the at least two LBAs). At some point after the data is written (e.g., either immediately after the data is written or at a scheduled time based on a determination of when a controller and/or the data storage device is idle or has a workload below a threshold), the data protection system calculates parity information (or hashing/parity information) for the data stored by the LBAs. The parity information is then stored in a global parity mesh table.

If data associated with one of the LBAs becomes corrupted, the parity information (or the hashing/parity information) in the global parity mesh table is used, in conjunction with data stored in the non-corrupted LBA, to recover the data associated with the corrupted LBA.

In an example, the global parity mesh table is stored (or is storable) at a number of different locations. For example, the global parity mesh table is stored by the data storage device itself. In another example, the global parity mesh table is stored in a conventional magnetic recording (CMR) drive and/or a shingled magnetic recording (SMR) drive. In yet another example, the global parity mesh table is remotely stored (e.g., by a host device). In another example, the global parity mesh table can be stored externally in a controller memory buffer (CMB), in a host memory buffer (HMB) or in a compute express link (CXL) environment.

In another example, the data protection system stores multiple copies of parity information (or hashing/parity information) in different sections of two or more associated LBAs. For example, when data is written to a first LBA, the data protection system calculates parity information associated with the data. A first copy of the parity information is stored in a first section of a second LBA that is associated with the first LBA and a second copy of the parity information is stored in a second section of a third LBA that is associated with the first LBA. Stated differently, a first copy of the parity information is stored in a second section of the first LBA (or N−2 from the third LBA or N−1 from second LBA that is associated with the N and N+1 LBA or second and third LBA) and a second copy of the parity information is stored in a first section of the third LBA (or Nth LBA or N+1 from the second LBA).

If the first LBA becomes corrupted (or data associated with the first LBA becomes corrupted), the data is recoverable using at least one of the first copy of the parity information and/or using the second copy of the parity information.

In accordance with the above, many technical benefits may be realized including, but not limited to, enabling data to be written to any desired data block and enabling parity information to be written with delay or at a scheduled time based on a determined workload of the data storage device; providing a cost effective method for data protection in a non-RAID or non-erasure coding environment; improving data storage device space utilization for uneven data storage device drive capacities when compared to traditional RAID; and enabling data recovery at the LBA level.

These benefits, along with other examples, will be shown and described in greater detail with respect to FIG. 1-FIG. 11.

FIG. 1 is a block diagram of a system 100 that includes a host device 105 and a data storage device 110 according to an example. In an example, the host device 105 includes a processor 115 and a memory 120 (e.g., main memory). The memory 120 includes or is otherwise associated with an operating system 125, a kernel 130 and/or an application 135.

The processor 115 can execute various instructions, such as, for example, instructions from the operating system 125 and/or the application 135. The processor 115 includes circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 includes a System on a Chip (SoC).

In an example, the memory 120 is used by the host device 105 to store data used, or otherwise executed by, the processor 115. Data stored in the memory 120 includes instructions provided by the data storage device 110 via a communication interface 140. The data stored in the memory 120 also includes data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 creates a virtual address space for the application 135 and/or other processes executed by the processor 115. The virtual address space maps to locations in the memory 120. The operating system 125 also includes or is otherwise associated with a kernel 130. The kernel 130 includes instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI), a compute express link (CXL) based interface or any other form of storage networking interface.

The data storage device 110 includes a controller 150 and a memory device 155. In an example, the controller 150 is communicatively coupled to the memory device 155. The memory device 155 includes one or more memory dies (e.g., a first memory die 165 and a second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. In one example, the memory cells are arranged in a two-dimensional configuration. In another example, the memory cells are arranged in a three-dimensional configuration.

In an example, the data storage device 110 is attached to or embedded within the host device 105. In another example, the data storage device 110 is implemented as an external device or a portable device that can be communicatively or selectively coupled to, and removed from, the host device 105. In yet another example, the data storage device 110 is a component (e.g., a solid-state drive (SSD)) of a network accessible data storage system, a network-attached storage system, a cloud data storage system, or the like.

As indicated above, the memory device 155 of the data storage device 110 includes a first memory die 165 and a second memory die 170. Although two memory dies are shown, the memory device 155 may include any number of memory dies (e.g., one memory die, two memory dies, eight memory dies, or another number of memory dies).

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

In an example, one or more of the first memory die 165 and the second memory die 170 include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different dies of memory may be logically linked together to form a metablock.

Figure 2A:
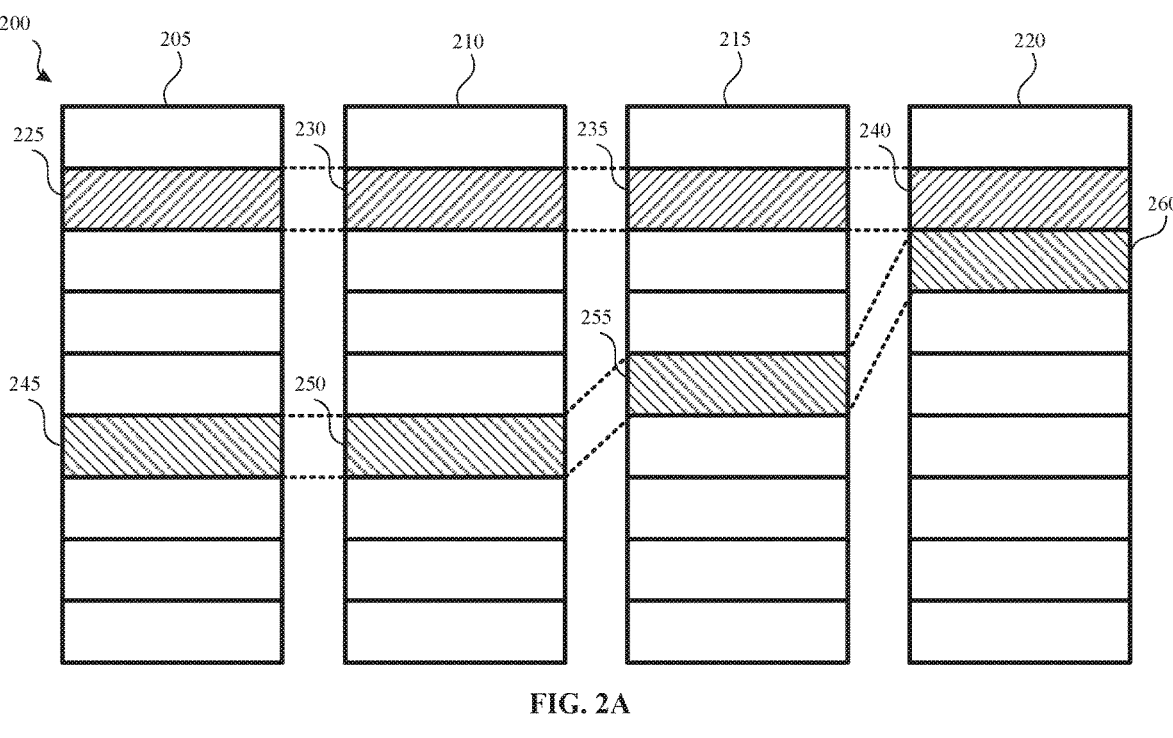
FIG. 2A illustrates how a memory device includes a number of memory blocks according to an example.

For example and referring to FIG. 2A, FIG. 2A illustrates how a memory device 200 includes a number of memory blocks according to an example. For example, the memory device 200 (e.g., a storage element, a memory die, a non-volatile memory device) includes four planes or sub-arrays (e.g., a first plane 205, a second plane 210, a third plane 215, and a fourth plane 220). In an example, the planes are integrated on a single memory die. In another example, the planes are provided on two different memory dies (e.g., two planes on each memory die). In yet another example, the planes are provided on four separate memory dies. Although four planes are shown and described, the memory device 200 may have any number of planes and/or memory dies.

In an example, each plane is divided into memory blocks consisting memory cells. As shown in FIG. 2A, the rectangles represent a memory block, such as memory block 225, memory block 230, memory block 235 and memory block 240. There may be dozens or hundreds of memory blocks in each plane of the memory device 200. In an example, each memory block is a unit of erase and is sometimes referred to as an erase block. For example, memory block 225, memory block 230, memory block 235 and memory block 240 include a minimum number of memory cells that are erased together.

In addition, various memory blocks are logically linked or grouped together (e.g., using a table in or otherwise accessible by the controller 150 (FIG. 1)) to form a metablock. A metablock is written to, read from and/or erased as a single unit. For example, memory block 225, memory block 230, memory block 235 and memory block 240 form a first metablock while memory block 245, memory block 250, memory block 255 and memory block 260 form a second metablock. The memory blocks used to form a metablock need not be restricted to the same relative locations within their respective planes.

In an example, each memory block is divided, for operational purposes, into pages of memory cells. For example and referring to FIG. 2B, FIG. 2B illustrates how a memory block includes one or more pages according to an example.

For example, the memory cells of memory block 225, memory block 230, memory block 235 and memory block 240 are divided into N different pages (shown as P0-PN). Although a specific number of pages are shown in FIG. 2B, a memory block may have any number of pages of memory cells within each memory block.

In an example, a page is a unit of data programming within the memory block. Each page includes the minimum amount of data that can be programmed at one time. The minimum unit of data that can be read at one time may be less than a page. For example, each page is further dividable into segments or units and each segment includes the fewest number of memory cells that may be written to at one time as a basic programming operation.

Figure 2B:
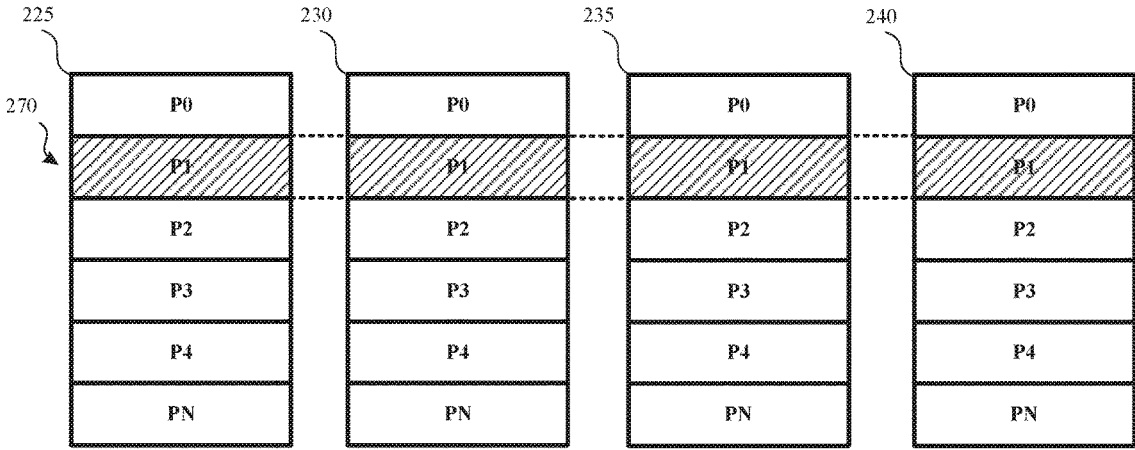
FIG. 2B illustrates how a memory block includes one or more pages according to an example.

A metapage 270 is illustrated in FIG. 2B as being formed of one physical page from memory block 225, memory block 230, memory block 235 and memory block 240. In the example, shown, the metapage 270 includes page P1 in each of the four memory blocks. However, the pages of the metapage 270 need not have the same relative position within each of the memory blocks. A metapage 270 may be the maximum unit of programming within a memory block.

The memory blocks disclosed in FIG. 2A-FIG. 2B are referred to herein as physical memory blocks because they relate to groups of physical memory cells as discussed above. As used herein, a logical memory block is a virtual unit of address space defined to have the same size as a physical memory block. Each logical memory block includes a range of logical memory block addresses (LBAs) that are associated with data received from a host. The LBAs are then mapped to one or more physical memory blocks in the data storage device 110 where the data is physically stored. Each memory block may include any number of memory cells. The design, size, and organization of a memory block may depend on the architecture, design, and application desired for each memory die.

Referring back to FIG. 1, in an example, the memory device 155 also stores LBA association information 175. As will be described herein, one LBA is associated with at least one other LBA when parity information is calculated. Thus, when the associations are determined, this information may be stored by the memory device 155. In another example, the LBA association information 175 is stored by a data protection system 180.

The data storage device 110 also includes a controller 150. Although a single controller 150 is shown and described, the data storage device 110 can include multiple controllers. In such an example, a first controller executes a first operation or set of operations and the second controller executes a second operation or set of operations. In an example, the first set of operations and the second set of operations are executed on the same memory dies. In other examples, the first set of operations is executed on a first memory die or a first set of memory dies and the second set of operations is executed on a second memory die or a second set of memory dies.

The controller 150 is communicatively coupled to the memory device 155 via a bus, an interface or other communication circuitry. In an example, the communication circuitry includes one or more channels to enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 receives data and/or instructions from the host device 105. The controller 150 also sends data to the host device 105. For example, the controller 150 sends data to and/or receives data from the host device 105 via the communication interface 140. The controller 150 also sends data and/or commands to, and/or receive data from, the memory device 155.

The controller 150 sends data and a corresponding write command to the memory device 155 to cause the memory device 155 to store data at a specified address of the memory device 155. In an example, the write command specifies a physical address of a portion of the memory device 155. The controller 150 also sends data and/or commands associated with one or more background scanning operations, garbage collection operations, and/or wear leveling operations.

The controller 150 also sends one or more read commands to the memory device 155. In an example, the read command specifies the physical address of a portion of the memory device 155 at which the data is stored. The controller 150 also tracks the number of program/erase cycles or other programming operations that have been performed on or by the memory device and/or the memory dies of the memory device 155.

The controller 150 also includes, or is otherwise associated with, a ECC system 185 and a data protection system 180. In an example, the ECC system 185 and/or the data protection system 180 are packaged functional hardware units designed for use with other components/systems. In another example, the ECC system 185 and/or the data protection system 180 is a portion of a program code (e.g., software or firmware) executable by a processor, the controller 150, or processing circuitry. In yet another example, the ECC system 185 and/or the data protection system 180 is a self-contained hardware and/or software component that interfaces with other components and/or systems. Although the ECC system 185 and the data protection system 180 are shown as being part of the controller 150, the ECC system 185 and/or the data protection system 180 may be separate from the controller 150.

In an example, the data protection system 180 is responsible for populating and maintaining a global parity mesh table (e.g., the global parity mesh table 395 (FIG. 3B)). The global parity mesh table includes parity information (or hashing/parity information) for two (or more) associated LBAs.

In an example, LBAs are associated based, at least in part, on an amount and/or type of data stored in each LBA. For example, if the data storage device 110 receives sequential data from the host device 105, the sequential data is stored in two (or more) associated LBAs. In another example, the data protection system 180 selects at least two LBAs for association regardless whether the LBAs store sequential data, random data and/or mixed workload data.

When data is received from the host device 105, the controller 150, in combination with the data protection system 180, identifies one or more LBAs (and physical memory blocks associated with the LBAs) to which the received data will be written. The data is then written to the LBAs. Once the data has been written to the LBAs, the data protection system 180 calculates parity information (or hashing/parity information) for the data that is stored in each LBA.

In an example, the parity information is calculated once the data has been written to the LBA. In another example, calculation of the parity information is scheduled (e.g., during an idle time and/or when a number of operations to be executed by the controller 150 and/or the data storage device 110 is below a threshold).

When the parity information is calculated, the data protection system 180 populates the global parity mesh table with the calculated parity information. In an example, this process is repeated each time data is written two associated or consecutive LBAs.

Figure 3A:
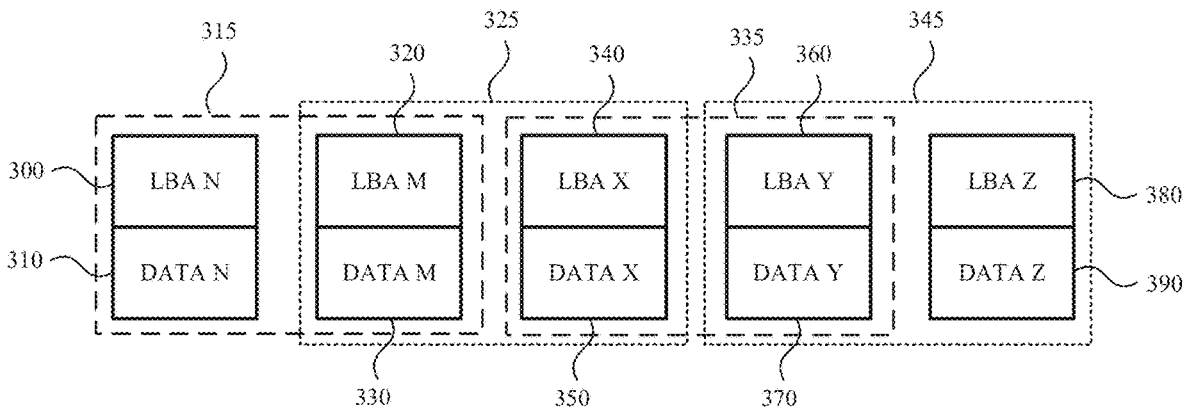
FIG. 3A illustrates how a first LBA is associated with a second LBA for the calculation of parity information according to an example.

For example and referring to FIG. 3A, FIG. 3A illustrates how a first LBA is associated with a second LBA for the calculation of parity information according to an example. In this example, five LBAs are shown-LBA N 300, LBA M 320, LBA X 340, LBA Y 360 and LBA Z 380. In an example, each LBA is logically mapped to one or more physical memory blocks (or locations) of one or more memory dies (or planes of one or memory dies) of a memory device (e.g., memory device 155 (FIG. 1)). Thus, when data is received from a host device (e.g., host device 105 (FIG. 1)), the data is associated with a particular LBA and is written to one or more physical memory blocks associated with the particular LBA. In an example, the received data is sequential data. In another example, the data is random data.

In the example shown in FIG. 3A, LBA N 300 is associated with Data N 310. Likewise, LBA M 320 is associated with Data M 330. When Data N 310 has been written to or otherwise associated with LBA N 300 and when Data M 330 has been written to or otherwise associated with LBA M 320, a data protection system (e.g., data protection system 180 (FIG. 1)) of the data storage device associates, or groups, LBA N 300 and LBA M 320. The association or grouping of LBA N 300 and LBA M 320 is shown in FIG. 3A by the dashed rectangle 315 (also referred to as LBA N & M 315).

In an example, the LBAs are sequential or adjacent one another. In another example, the memory blocks associated with each of the LBAs are adjacent one another. In yet another example, the LBAs are associated with each other due to the fact that LBA N 300 was written to first and LBA M 320 was written to after LBA N 300. Although specific examples of grouping are mentioned, the data protection system may group any LBA with another LBA for the purpose of calculating parity information.

When data has been received and/or written to at least two LBAs, the data protection system calculates parity information for the associated pair or group of LBAs. In an example and as previously described, the calculation of parity information may commence when data has been written to LBA N 300 and LBA M 320. In another example, the calculation of parity information may be scheduled for a later time. Additionally, although parity information is specifically mentioned, the data protection system may calculate hashing and parity information for the group consisting of LBA N 300 and LBA M 320.

Figure 3B:
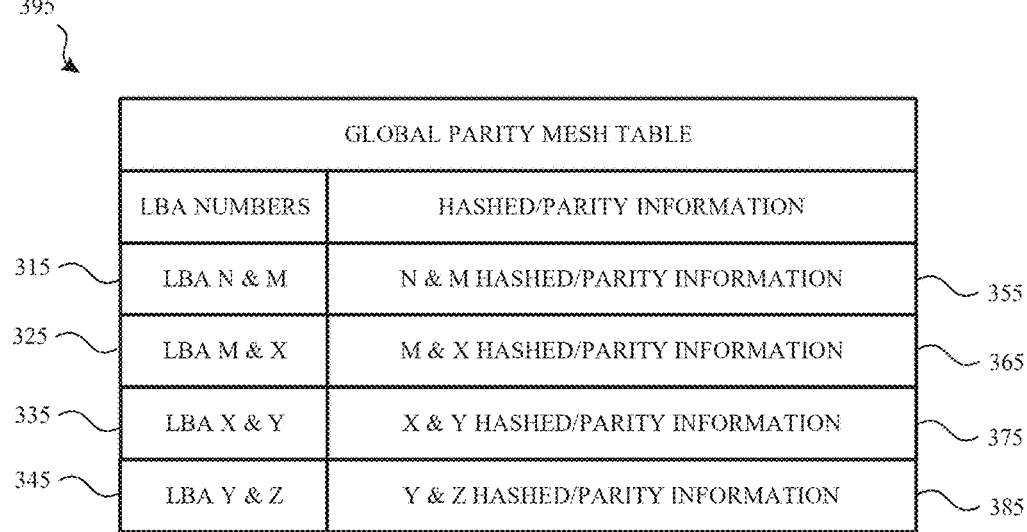
FIG. 3B illustrates a global parity mesh table according to an example.

When the parity information has been calculated for two associated LBAs, the data protection system stores the parity information in a global parity mesh table. For example, and referring to FIG. 3B, FIG. 3B illustrates a global parity mesh table 395 according to an example. As shown in FIG. 3B, the data protection system stores N & M hashed/parity information 355 for LBA N & M 315. In an example, when data associated with at least one of LBA N 300 and LBA M 320 is updated, the data protection system also updates the N & M hashed/parity information 355 in the global parity mesh table 395.

Referring back to FIG. 3A, this process is repeated for other pairs or groups of LBAs. In some examples, a particular LBA is placed in, or otherwise associated with, multiple groups. For example, when Data X 350 is written to LBA X 340, the data protection system associates LBA M 320 with LBA X 340 (represented by the dashed rectangle 325 and also referred to as LBA M & X 325). As such, LBA M 320 is associated with two different LBAs and/or is in two different groups of LBAs.

The data protection system also calculates parity information for LBA M & X 325 and stores this information in the global parity mesh table 395. For example and referring back to FIG. 3B, the data protection system has calculated and stored M & X hashed/parity information 365 in the global parity mesh table 395 and has associated this information with LBA M & X 325.

Referring again to FIG. 3A, when Data Y 370 is written to LBA Y 360, the data protection system associates LBA X 340 with LBA Y 360 (represented by the dashed rectangle 335 and also referred to as LBA X & Y 335), calculates parity information for LBA X & Y and stores the parity information in the global parity mesh table (shown as LBA X & Y hashed/parity information 375 in FIG. 3B). Likewise, when Data Z 390 is written to LBA Z 380, the data protection system associates LBA Y 360 with LBA Z 380 (represented by the dashed rectangle 345 and also referred to as LBA Y & Z 345), calculates parity information, and stores the parity information in the global parity mesh table (shown as LBA Y & Z hashed/parity information 385 in FIG. 3B).

Referring back to FIG. 1, when the global parity mesh table has been created, the global parity mesh table is stored in the memory device 155. In another example, the global parity mesh table is stored by the controller 150. In yet another example, the global parity mesh table is stored by the host device 105. In still other examples, the global parity mesh table is stored in the cloud or in another remote database. The data protection system 180 is also responsible for maintaining and/or updating the global parity mesh table (e.g., when new/updated data associated with each LBA is received).

The data protection system 180, either alone or in combination with, the ECC system 185, is also responsible for correcting corrupted data stored by one or more of the LBAs. For example, if data in one LBA is (or becomes) corrupted, the ECC system 185 and/or the data protection system 180 identifies the corrupt LBA, accesses the global parity mesh table to identify the group of LBAs to which the corrupt LBA belongs and uses the hashed/parity information associated with the LBA group, along with the data stored by the non-corrupted LBA, to correct the corrupted data.

For example and referring back to FIG. 3A and FIG. 3B, if Data N 310 associated with LBA N 300 is good, but all other LBAs and the associated data is corrupted, the data protection system and/or the ECC system would attempt to recover Data M 330 associated with LBA M 320. As such, the data protection system and/or the ECC system access the global parity mesh table 395 and determine that LBA M 320 is part of LBA N & M 315. The data protection system and/or the ECC system also access N & M hashed/parity information 355 stored in the global parity mesh table 395 are use N & M hashed/parity information 355, along with Data N 310, to correct Data M 330 associated with LBA M 320.

This process will be repeated for each of the other corrupted LBAs. For example, to correct Data X 350 associated with LBA X 340, the data protection system and/or the ECC system access the global parity mesh table 395 and determine that LBA X 340 is part of LBA M & X 325. The data protection system and/or the ECC system also access M & X hashed/parity information 365 stored in the global parity mesh table 395 and use this information, along with newly corrected Data M 330, to correct Data X 350 associated with LBA X 340.

In an example, the data recovery is bi-directional and/or data associated with different LBAs can be recovered in parallel. For example, if Data X 350 associated with LBA X 340 is good and the data associated with each of the other LBAs is corrupt, the data protection system and/or the ECC system determine, by accessing the global parity mesh table 395, that LBA X 340 is grouped with LBA M 320 and is grouped with LBA Y 360.

The data protection system and/or the ECC system access M & X hashed/parity information 365 associated with LBA M & X 325 and uses M & X hashed/parity information 365, along with Data X 350, to recover Data M 330 associated with LBA M 320. Additionally, the data protection system and/or the ECC system accesses X & Y hashed/parity information 375 associated with LBA X & Y 335 and use this information, along with Data X 350, to recover Data Y 370 associated with LBA Y 360. This process is repeated for Data N 310 and Data Z 390.

In another example, the data protection system 180 is also configurable to provide LBA level data protection by storing parity information (or hashing/parity information) at each LBA. In this example, the data protection system 180 logically divides each LBA (or each physical memory block associated with each LBA) into three different portions or sections. For example, each LBA includes a first data recovery section (or a LBA header), a second data recovery section (or a LBA tail) and a data section. Multiple copies of parity information for a particular LBA are stored in different data recovery sections of associated LBAs.

Figure 4:
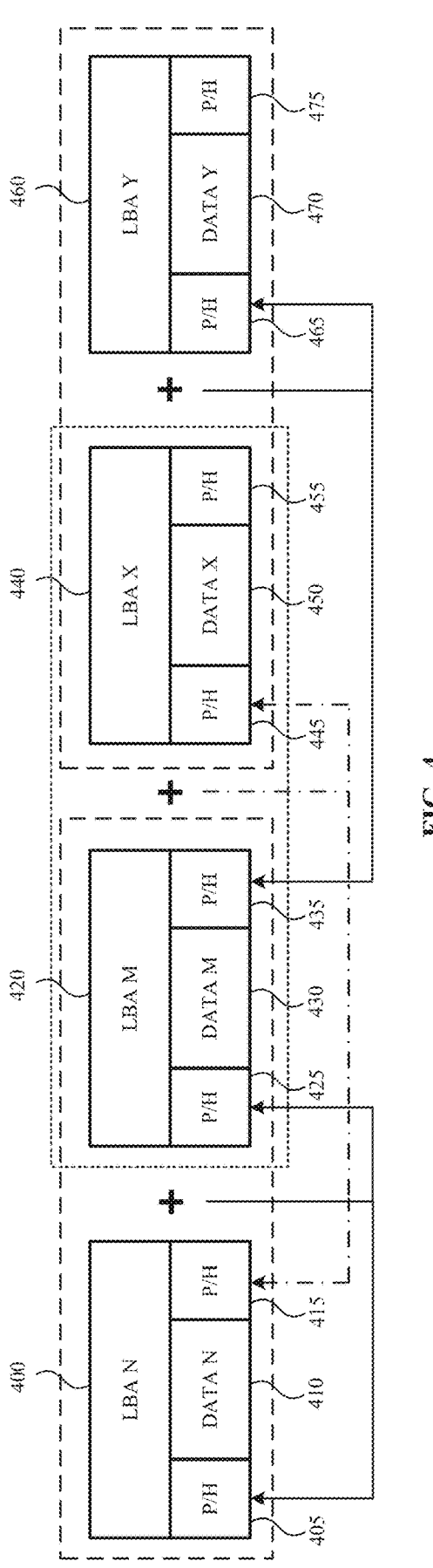
FIG. 4 illustrates how multiple copies of parity information are stored in various data recovery sections of associated LBAs according to an example.

For example and referring to FIG. 4, FIG. 4 illustrates how multiple copies of parity information are stored in various data recovery sections of associated LBAs according to an example. In the example shown in FIG. 4, a data storage device (e.g., the data storage device 110 (FIG. 1)) includes four LBAs-LBA N 400, LBA M 420, LBA X 440 and LBA Y 460.

Although four LBAs are shown and described, the data storage device can include any number of LBAs.

As also shown in FIG. 4, each LBA is divided into three portions or sections. For example, LBA N 400 includes a first data recovery section 405, a data section 410 and a second data recovery section 415. Continuing with the example, LBA M 420 includes a first data recovery section 425, a data section 430 and a second data recovery section 435. Likewise, LBA X 440 includes a first data recovery section 445, a data section 450 and a second data recovery section 455 and LBA Y 460 includes a first data recovery section 465, a data section 470 and a second data recovery section 475. In an example, some of the LBAs are adjacent each other. In another example, the LBAs are random.

In an example, and depending on a size of sectors supported by the data storage device (e.g., whether the data storage device supports 4K sectors, 512 sectors etc.), the size of each section may vary. For example, in a 512 formatting implementation, the first data recovery section 405 and the second data recovery section 415 may have a size of 85 bytes. However, in a 4K formatting implementation, the first data recovery section 405 and the second data recovery section 415 may have a size of 682 bytes. In an example, the data protection system 180 is operable to determine the format of the data storage device prior to dividing the LBA into the various sections.

When data is received (e.g., from the host device 105 (FIG. 1)), the data is written into the data section of one or more of the LBAs. For example, at least a portion of the data, Data N, is written to the data section 410 of LBA N 400. Upon completion of the write operation, calculation of parity information for Data N commences (or is scheduled such as described herein).

When the parity information has been calculated, a first copy of the parity information associated with Data N is stored in the first data recovery section 405 of LBA N 400. Additionally, a second copy of the parity information associated with Data N is stored in the first data recovery section 425 of LBA M 420. In an example, LBA N 400 and LBA M 420 are associated and/or are grouped by the data protection system.

This process continues for the other LBAs. For example, when Data M is written to the data section 430 of LBA M 420, parity information associated with Data M is calculated. A first copy of the parity information for Data M is stored in the second data recovery section 415 of LBA N 400 and a second copy of the parity information for Data M is stored in the first data recovery section 445 of LBA X 440.

Continuing with the example, when Data X is written to the data section 450 of LBA X 440, parity information associated with Data X is calculated by the data protection system. A first copy of the parity information for Data X is stored in the second data recovery section 435 of LBA M 420 and a second copy of the parity information for Data M is stored in the first data recovery section 465 of LBA Y 460.

If data in any of the LBAs becomes corrupted, at least one of the copies of the parity information stored in any of the other associated LBAs is usable to correct the corrupted data. For example, if LBA M 420 fails (or is Data M is corrupted), the first copy of parity information stored in the second data recovery section 415 of LBA N 400 and/or the second copy of parity information stored in the first data recovery section 445 of LBA X 440 may be used (e.g., by the ECC system) to recover the data.

In another example, if Data M in LBA M 420 and Data X in LBA X 440 is corrupted, the data protection system and/or the ECC system can correct Data M using the first copy of parity information stored in the second data recovery section 415 of LBA N. Likewise, the data protection system and/or the ECC system can also correct Data X (e.g., in series or in parallel with the correction of Data X) by using the second copy of parity information associated with Data X that is stored in the first data recovery section 465 of LBA Y 460.

Figure 5:
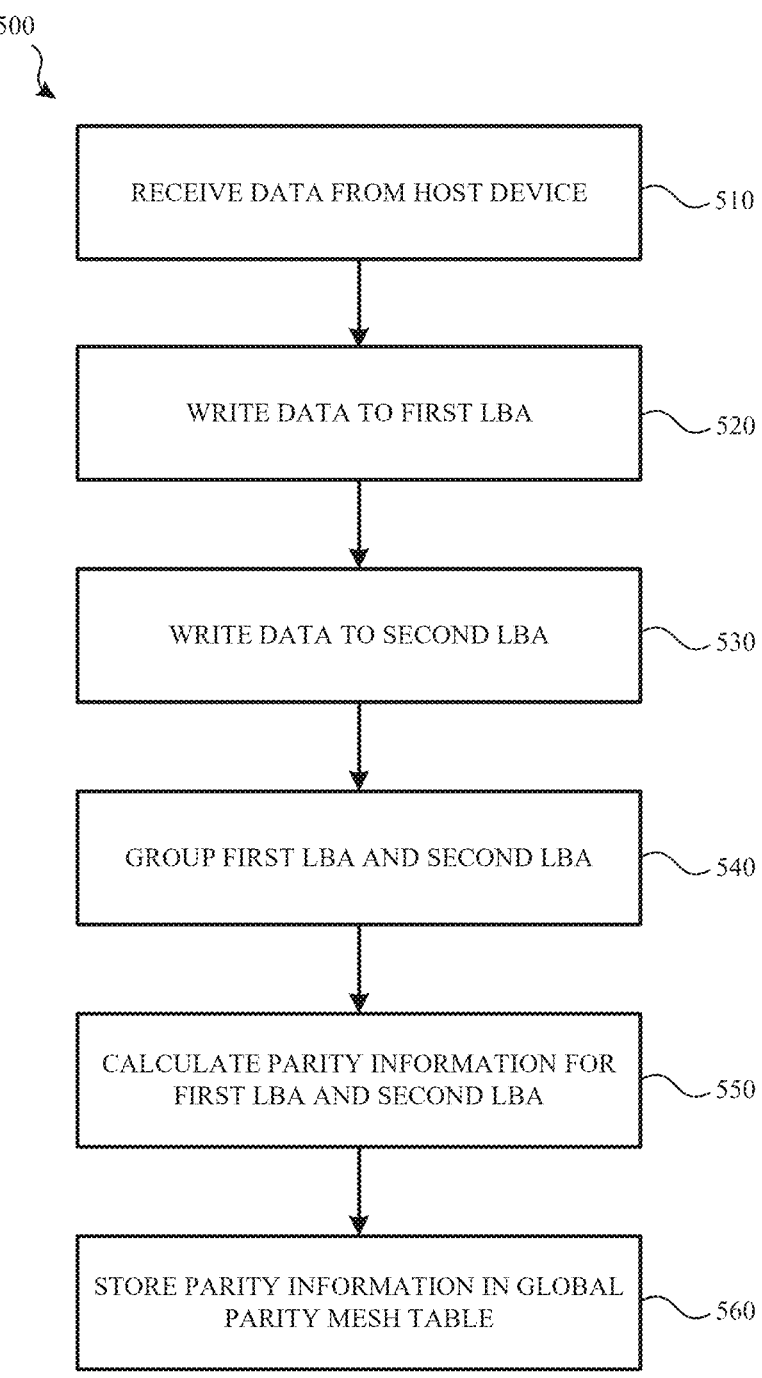
FIG. 5 illustrates a method for creating and populating a global parity mesh table according to an example.

FIG. 5 illustrates a method 500 for creating and populating a global parity mesh table according to an example. In an example, the method 500 is performed by a data protection system (e.g., data protection system 180 (FIG. 1)) of a data storage device (e.g., data storage device 110 (FIG. 1)). Additionally, the method 500 may be used to populate the global parity mesh table 395 shown and described with respect to FIG. 3B.

In an example, the method 500 begins when data is received (510) from a host device. In an example, the data is sequential data. In another example, the data is random data.

When the data is received, a controller and/or the data protection system causes the data to be written (520) in a first LBA (or to be written in one or more physical memory blocks associated with the first LBA). Additionally, the controller and/or the data protection system causes the data to be written (530) in a second LBA (or to be written in one or more physical memory blocks associated with the second LBA).

The data protection system then associates or groups (540) the first LBA with the second LBA. Based at least in part on grouping the first LBA and the second LBA, the data protection system calculates (550) parity information (or hashing and parity information) for the data stored in the first LBA and the second LBA. In an example, the calculation of parity information occurs after data has been written to the second LBA. In another example, the data protection system schedules the calculation of parity information such as previously described.

When the parity information for the first LBA and the second LBA has been calculated, the data protection system stores (560) the parity information in a global parity mesh table. In an example, the parity information for the first LBA and the second LBA is associated with the group of LBAs that includes the first LBA and the second LBA.

In an example, the method 500 is repeated when data has been written to another LBA. For example, when the controller and/or the data protection system cause data to be written to a third LBA, the data protection system associates or groups the third LBA with the second LBA and the previously described operations are repeated with respect to the grouping of the second LBA and the third LBA.

Figure 6:
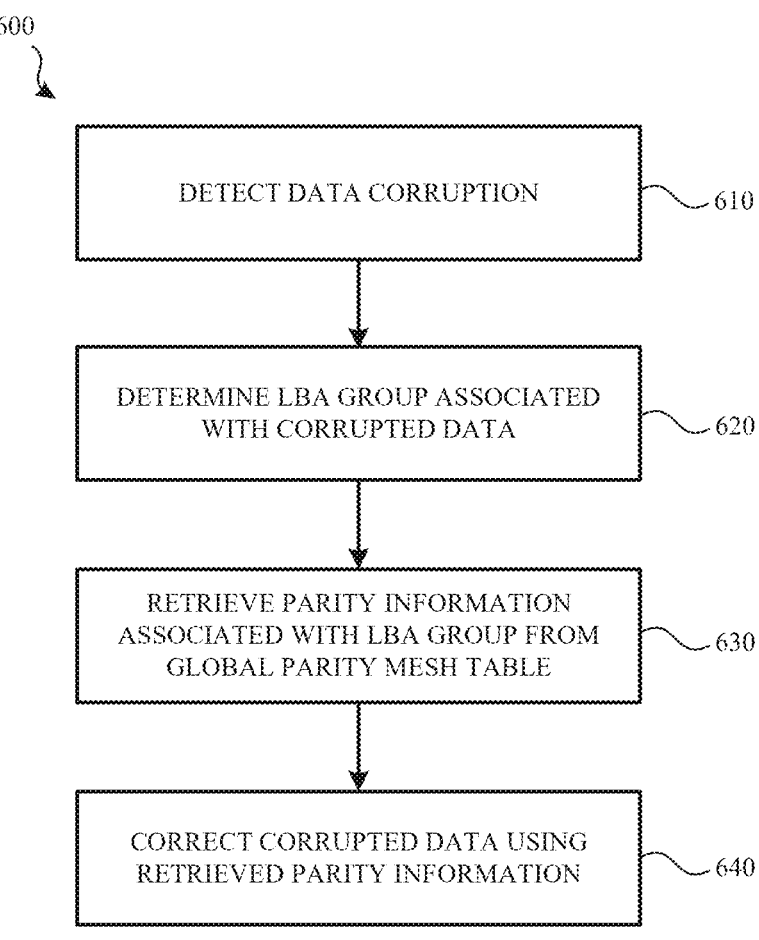
FIG. 6 illustrates a method for recovering corrupted data using a global parity mesh table according to an example.

FIG. 6 illustrates a method 600 for recovering corrupted data using a global parity mesh table according to an example. In an example, the method 600 is executed by a data protection system (e.g., the data protection system 180 (FIG. 1)) and/or an ECC system (e.g., ECC system 185 (FIG. 1)) of a data storage device (e.g., the data storage device 110 (FIG. 1)). Additionally, the data protection system executes the method 600 using the global parity mesh table 395 shown and described with respect to FIG. 3B.

In an example, the method 600 begins when the data protection system and/or the ECC system detects (610) or determines that at least one LBA (or the data associated with at least one LBA) is corrupted or has otherwise grown bad. In example, the data protection system and/or the ECC system may use any operation or technique to determine whether the data associated with a particular LBA has become corrupted.

When the data protection system and/or the ECC system determines that data associated with the particular LBA has become corrupted, the data protection system and/or the ECC system determines (620) a LBA group associated with the LBA that has the corrupted data. For example, and referring to FIG. 3A and FIG. 3B, if the data protection system and/or the ECC system determines that Data M 330 associated with LBA M 320 is corrupted, the data protection system and/or the ECC system accesses the global parity mesh table 395 and determines that LBA M 320 is associated with LBA N 300 and LBA X 340.

The data protection system and/or the ECC system retrieves (630) parity information associated with the identified group of LBAs from the global parity mesh table. For example, the data protection system and/or the ECC system will retrieve N & M hashed/parity information 355 or M & X hashed/parity information 365 from the global parity mesh table 395.

When the parity information has been retrieved, the data protection system and/or the ECC system corrects (640) the corrupted data using the retrieved parity information. For example, the data protection system and/or the ECC system will correct Data M 330 associated with LBA M 320 using Data N 310 and N & M hashed/parity information 355 or using Data X 350 and M & X hashed/parity information 365.

Figure 7:
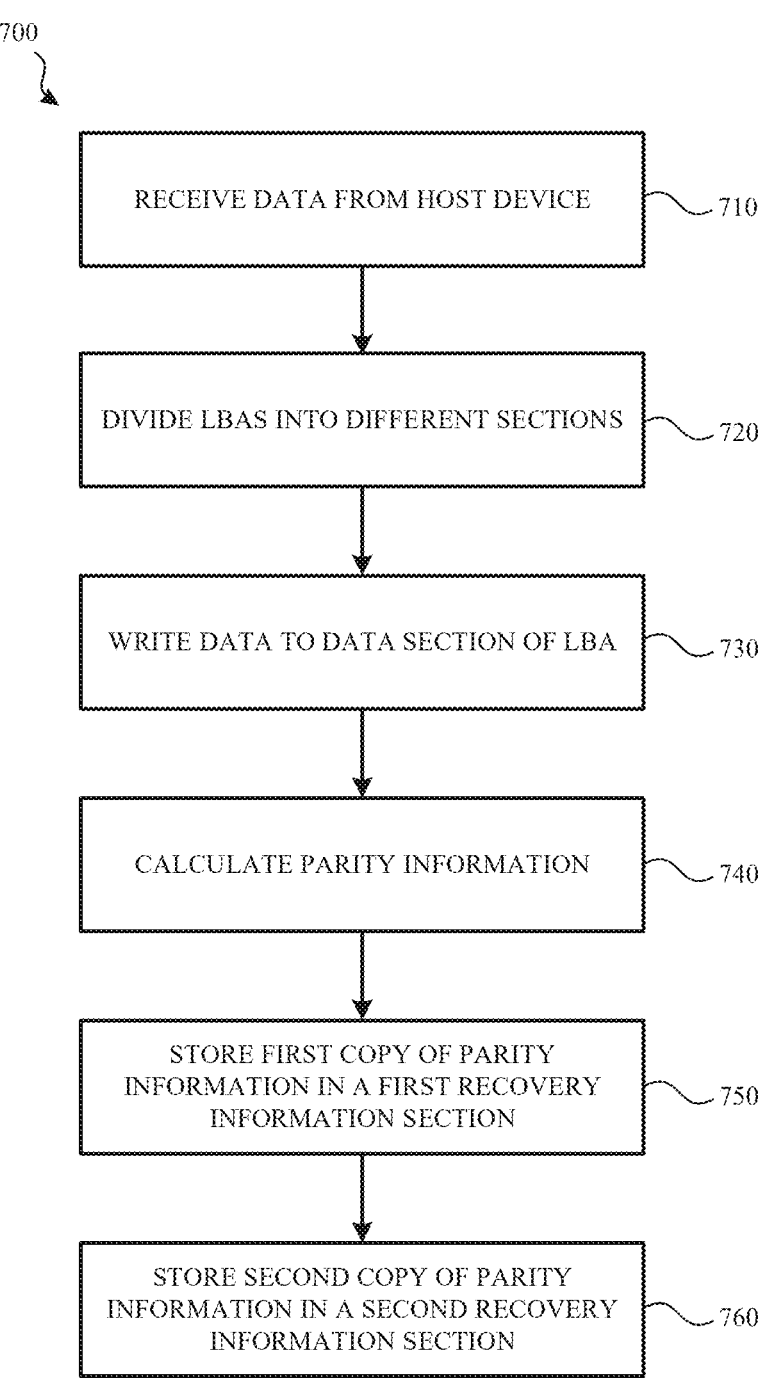
FIG. 7 illustrates a method for creating parity information for a particular LBA and for storing multiple copies of the parity information in associated LBAs according to an example.

FIG. 7 illustrates a method 700 for creating parity information for a particular LBA and for storing multiple copies of the parity information in associated LBAs according to an example. In an example, the method 700 is performed by a data protection system (e.g., data protection system 180 (FIG. 1)) of a data storage device (e.g., data storage device 110 (FIG. 1)).

Method 700 begins when data is received (710) from a host device. In an example, the data is to be written to one or more LBAs (or to physical memory blocks associated with the one or more LBAs). In one example, the data is random data. In another example, the data is sequential data.

In an example, the data protection system also divides each LBA into sections. For example, the LBA is divided into a data section, a first data recovery section and a second data recovery section. A size of each section is dependent on a capacity of the LBAs and/or the data storage device. For example, if the data storage device has a first format (e.g., a high capacity format) the first data recovery section and the second data recovery section will have a first size and the data section will have a second size. However, if the data storage device has a second format (e.g., a low capacity format) the first data recovery section and the second data recovery section will have a third size and the data section will have a fourth size.

The data protection system also causes the received data to be written (730) to the data section of a particular LBA. The data protection system also calculates (740) parity information associated with the data. In an example, the parity information is calculated upon completion of the data being written to the particular LBA. In another example, the data protection system schedules the calculation of parity information such as previously described.

The data protection system also determines one or more LBAs that are associated with the particular LBA. The data protection system then stores (750) a first copy of the parity information in a first data recovery section associated with a first LBA and stores (760) a second copy of the parity information in a second data recovery section associated with a second LBA.

For example and referring to FIG. 4, if data is written to LBA M 420, the data protection system calculates parity information for Data M 430 and stores a first copy of the parity information in the second data recovery section 415 of LBA N 400. Additionally, the data protection system stores a second copy of the parity information in the first data recovery section 445 of LBA X 440.

Figure 8:
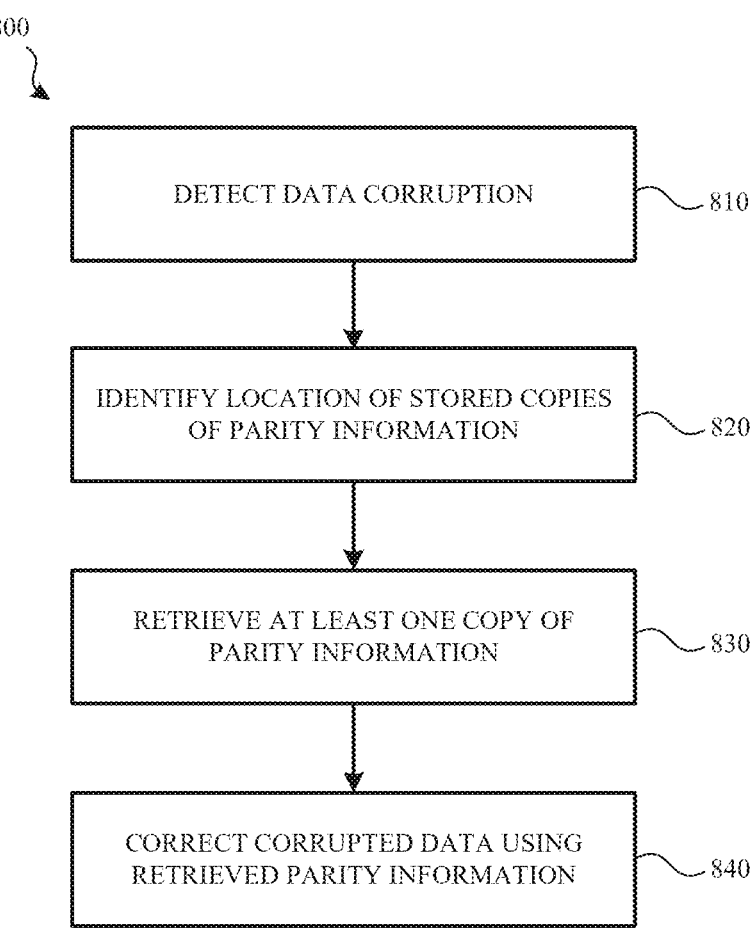
FIG. 8 illustrates a method for recovering corrupted data associated with a particular LBA using at least one copy of parity information stored in an LBA associated with the particular LBA according to an example.

FIG. 8 illustrates a method 800 for recovering corrupted data associated with a particular LBA using at least one copy of parity information stored in an LBA associated with the particular LBA according to an example. In an example, the method 800 is executed by a data protection system (e.g., the data protection system 180 (FIG. 1)) and/or an ECC system (e.g., ECC system 185 (FIG. 1)) of a data storage device (e.g., the data storage device 110 (FIG. 1)).

In an example, the method 800 begins when the data protection system and/or the ECC system detects (810) or determines that at least one LBA (or the data associated with at least one LBA) is corrupted or has otherwise grown bad. In example, the data protection system and/or the ECC system may use any operation or technique to determine whether the data associated with a particular LBA has become corrupted.

When the data protection system and/or the ECC system determines that data associated with the particular LBA has become corrupted, the data protection system and/or the ECC system identifies (820) a location of the stored copies of parity information associated with the particular LBA.

For example, and referring to FIG. 4, if the data protection system and/or the ECC system determines that Data M 430 associated with LBA M 420 is corrupted, the data protection system and/or the ECC system determines that a first copy of the parity information for Data M 430 is stored in the second data recovery section 415 of LBA N 400. Additionally, the data protection system determines that a second copy of the parity information associated with Data M 430 is stored in the first data recovery section 445 of LBA X 440.

When the locations of parity information have been determined, the data protection system and/or the ECC system retrieves (830) at least one copy of the parity information. When at least one copy of the parity information has been retrieved, the data protection system and/or the ECC system corrects (840) the corrupted data using the retrieved parity information. For example, the data protection system and/or the ECC system will correct Data M 430 associated with LBA M 420 using at least one of the copies of parity information stored in the first data recovery section 445 of LBA X 440 or in the second data recovery section 415 of LBA N 400.

In an example, the various methods described herein also increase a read performance of the data storage device. For example, when a read request is received from a host device (e.g., the host device 105 (FIG. 1)), a controller of the data storage device will search a cache for the requested data. If the requested data is in the cache, the read request is serviced from the cache.

However, if the requested data is not in the cache, the controller causes the data to be retrieved from the physical memory blocks. However, in the various implementations described herein, at least one LBA will have information corresponding to at least one other LBA. Thus, data associated with each LBA can be fetched. For example, if one LBA stores at least a portion of the requested data, the data protection system and/or the controller also causes data associated with a second LBA to be retrieved (because the second LBA is associated with the first LBA). The retrieved data from each associated LBA may then be copied into the cache.

Figure 9:
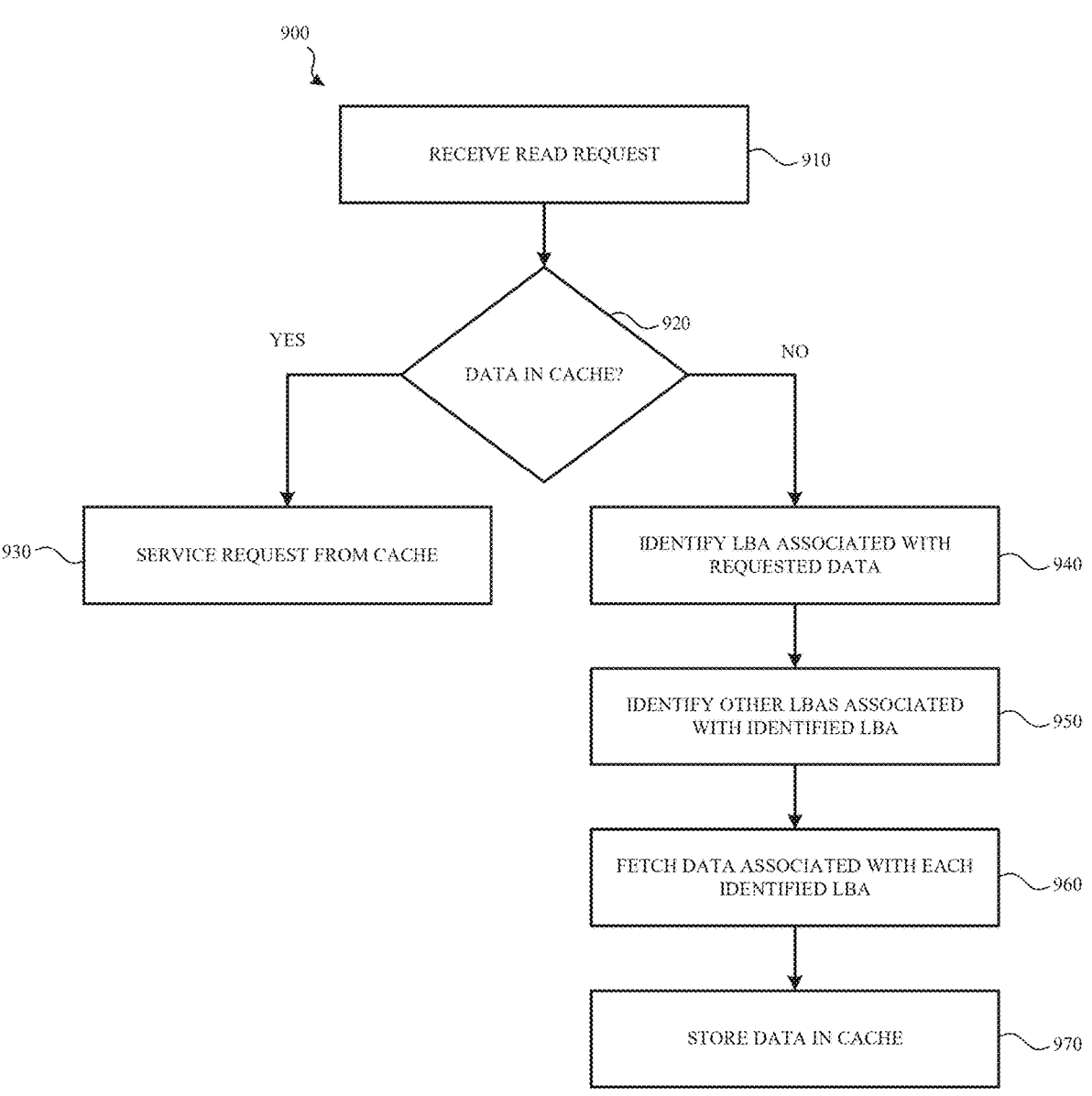
FIG. 9 illustrates a method for executing a read operation according to an example.

FIG. 9 illustrates a method 900 for executing a read operation according to an example. In an example, the method 900 is executed by a controller (e.g., the controller 150) of a data storage device (e.g., the data storage device 110 (FIG. 1)). In an example, the method 900 is executable by the controller based, at least in part, on the association of various LBAs such as described herein.

In an example, the method 900 begins when a read request is received (900). The read request is received from a host device (e.g., host device 105 (FIG. 1)) and is a request for data that is stored by, or is otherwise associated with one or more LBAs.

When the read request is received, the controller determines (920) whether the data associated with read request is in a cache of the data storage device. If controller determines (920) the data is stored in the cache, the controller causes the read request to be serviced (930) from the cache.

However, if the controller determines (920) that the requested data is not in the cache, the controller identifies (940) an LBA associated with the requested data. The controller also identifies (950) other LBAs associated with the identified LBA. In an example, the controller is able to identify the other LBAs associated with the identified LBA based, at least in part, on the associations or groups that are created when parity information (or hashing/parity information) is created such as previously described.

When the other LBAs are identified, the data associated with the identified LBA and the data associated with the other LBAs is fetched (960). The fetched data is then stored (970) in the cache. As a result, any subsequent read operations associated with the newly fetched data may be serviced from the cache.

Figures 10, 11:
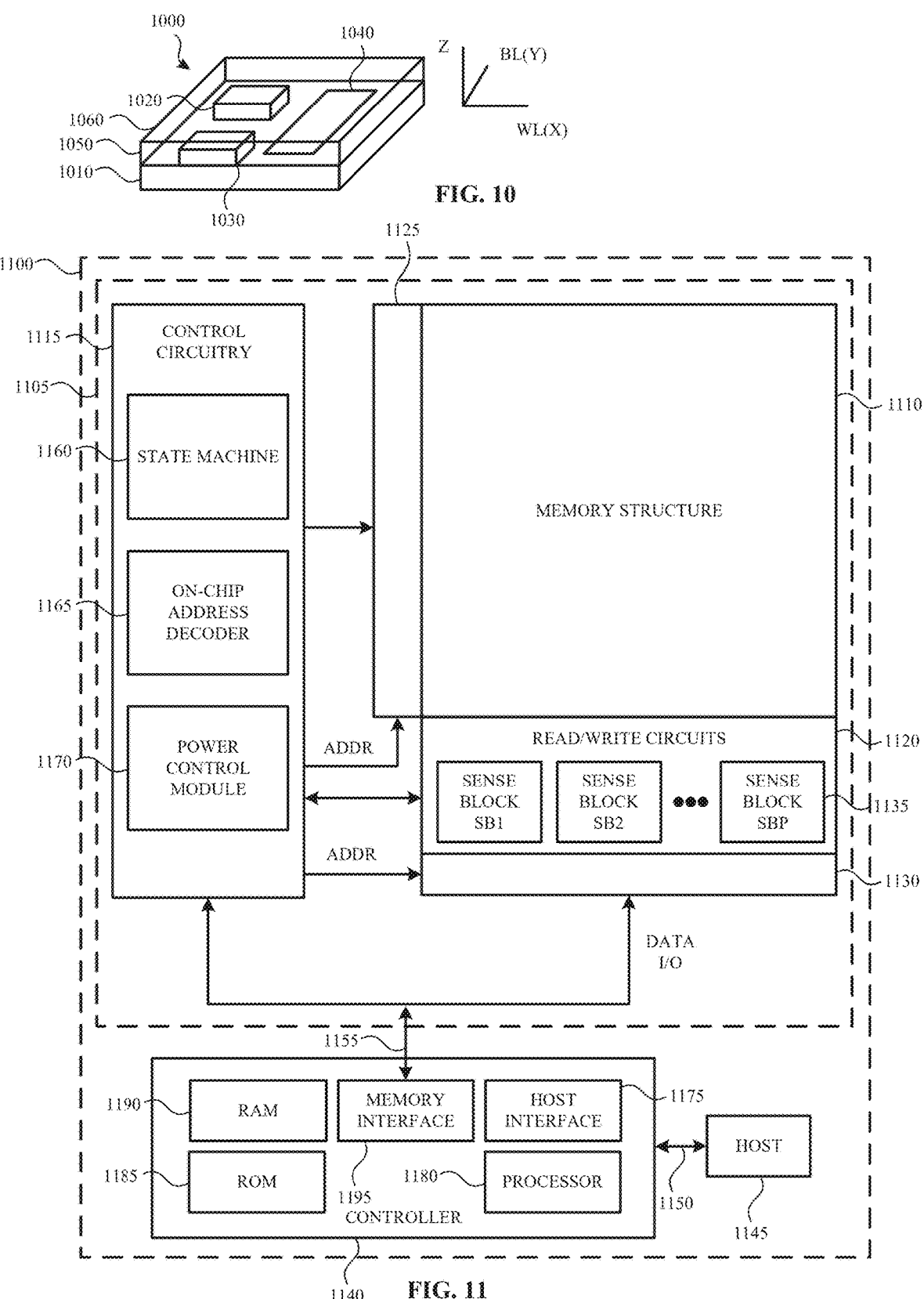
FIG. 10 is a perspective view of a storage device that includes three-dimensional (3D) stacked non-volatile memory according to an example.
FIG. 11 is a block diagram of a storage device according to an example.

FIG. 10-FIG. 11 describe example storage devices that may be used with or otherwise implement the various features described herein. For example, the storage devices shown and described with respect to FIG. 10-FIG. 11 may include various systems and components that are similar to the systems and components shown and described with respect to FIG. 1. For example, the controller 1140 shown and described with respect to FIG. 11 may be similar to the controller 150 of FIG. 1. Likewise, the memory dies 1105 may be similar to the first memory die 165 and/or the second memory die 170 of FIG. 1.

FIG. 10 is a perspective view of a storage device 1000 that includes three-dimensional (3D) stacked non-volatile memory according to an example. In this example, the storage device 1000 includes a substrate 1010. Blocks of memory cells are included on or above the substrate 1010. The blocks include a first block (BLK0 1020) and a second block (BLK1 1030). Each block is formed of memory cells (e.g., non-volatile memory elements). The substrate 1010 also includes a peripheral area 1040 having support circuits that are used by the first block and the second block.

The substrate 1010 also carries circuits under the blocks, along with one or more lower metal layers which are patterned in conductive paths to carry signals from the circuits. In an example, the blocks are formed in an intermediate region 1050 of the storage device 1000. The storage device also includes an upper region 1060. The upper region 1060 includes one or more upper metal layers that are patterned in conductive paths to carry signals from the circuits. Each block of memory cells includes a stacked area of memory cells. In an example, alternating levels of the stack represent word lines. While two blocks are depicted, additional blocks may be used and extend in the x-direction and/or the y-direction.

In an example, a length of a plane of the substrate 1010 in the x-direction represents a direction in which signal paths for word lines or control gate lines extend (e.g., a word line or drain-end select gate (SGD) line direction) and the width of the plane of the substrate 1010 in the y-direction represents a direction in which signal paths for bit lines extend (e.g., a bit line direction). The z-direction represents a height of the storage device 1000.

FIG. 11 is a functional block diagram of a storage device 1100 according to an example. In an example, the storage device 1100 is similar to the 3D stacked non-volatile storage device 1000 shown and described with respect to FIG. 10. In an example, the components depicted in FIG. 11 are electrical circuits. In an example, the storage device 1100 includes one or more memory dies 1105. Each memory die 1105 includes a three-dimensional memory structure 1110 of memory cells (e.g., a 3D array of memory cells), control circuitry 1115, and read/write circuits 1120. In another example, a two-dimensional array of memory cells may be used. The memory structure 1110 is addressable by word lines using a first decoder 1125 (e.g., a row decoder) and by bit lines using a second decoder 1130 (e.g., a column decoder). The read/write circuits 1120 may also include multiple sense blocks 1135 including SB1, SB2, . . . , SBp (e.g., sensing circuitry) which allow pages of the memory cells to be read or programmed in parallel. The sense blocks 1135 may include bit line drivers.

In an example, a controller 1140 is included in the same storage device 1100 as the one or more memory dies 1105. In another example, the controller 1140 is formed on a die that is bonded to a memory die 1105, in which case each memory die 1105 may have its own controller 1140. In yet another example, a controller die controls all of the memory dies 1105. Although a single controller 1140 is shown, the storage device 1100 can include multiple controllers with each controller responsible for different operations described herein.

Commands and data are transferred between a host 1145 and the controller 1140 using a data bus 1150. Additionally, commands and data are transferred between the controller 1140 and one or more of the memory dies 1105 by way of lines 1155. In one example, the memory die 1105 includes a set of input and/or output (I/O) pins that connect to lines 1155.

The memory structure 1110 also includes one or more arrays of memory cells. The memory cells are arranged in a three-dimensional array or a two-dimensional array. The memory structure 1110 includes any type of non-volatile memory that is formed on one or more physical levels of arrays of memory cells having an active area disposed above a silicon substrate. The memory structure 1110 may be in a non-volatile memory device having circuitry associated with the operation of the memory cells, whether the associated circuitry is above or within the substrate.

The control circuitry 1115 works in conjunction with the read/write circuits 1120 to perform memory operations (e.g., erase, program, read, and others) on the memory structure 1110. The control circuitry 1115 may include registers, ROM fuses, and other devices for storing default values such as base voltages and other parameters.

The control circuitry 1115 also includes a state machine 1160, an on-chip address decoder 1165 and a power control module. The state machine 1160 provides chip-level control of various memory operations, such as selecting a memory block for programming. The state machine 1160 is programmable by software. In another example, the state machine 1160 does not use software and is completely implemented in hardware (e.g., electrical circuits).

The on-chip address decoder 1165 provides an address interface between addresses used by host 1145 and/or the controller 1140 to a hardware address used by the first decoder 1125 and the second decoder 1130. The power control module 1170 controls power and voltages that are supplied to the word lines and bit lines during memory operations. The power control module 1170 may include drivers for word line layers in a 3D configuration, select transistors (e.g., SGS and SGD transistors) and source lines. The power control module 1170 may include one or more charge pumps for creating voltages.

The control circuitry 1115, the state machine 1160, the on-chip address decoder 1165, the first decoder 1125, the second decoder 1130, the power control module 1170, the sense blocks 1135, the read/write circuits 1120, and/or the controller 1140 may be considered one or more control circuits and/or a managing circuit that perform some or all of the operations described herein.

In an example, the controller 1140, is an electrical circuit that may be on-chip or off-chip. Additionally, the controller 1140 may include one or more processors 1180, ROM 1185, RAM 1190, memory interface 1195, and host interface 1175, all of which may be interconnected. In an example, the one or more processors 1180 is one example of a control circuit. Other examples can use state machines or other custom circuits designed to perform one or more functions. Devices such as ROM 1185 and RAM 1190 may include code such as a set of instructions. One or more of the processors 1180 may be operable to execute the set of instructions to provide some or all of the functionality described herein.

Alternatively or additionally, one or more of the processors 1180 may access code from a memory device in the memory structure 1110, such as a reserved area of memory cells connected to one or more word lines. The memory interface 1195, in communication with ROM 1185, RAM 1190, and one or more of the processors 1180, may be an electrical circuit that provides an electrical interface between the controller 1140 and the memory die 1105. For example, the memory interface 1195 may change the format or timing of signals, provide a buffer, isolate from surges, latch I/O, and so forth.

The one or more processors 1180 may issue commands to control circuitry 1115, or any other component of memory die 1105, using the memory interface 1195. The host interface 1197, in communication with the ROM 1185, the RAM 1190, and the one or more processors 1180, may be an electrical circuit that provides an electrical interface between the controller 1140 and the host 1145. For example, the host interface 1197 may change the format or timing of signals, provide a buffer, isolate from surges, latch I/O, and so on. Commands and data from the host 1145 are received by the controller 1140 by way of the host interface 1197. Data sent to the host 1145 may be transmitted using the data bus 1150.

Multiple memory elements in the memory structure 1110 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Accordingly, examples of the present disclosure describe a method, comprising: receiving first data from a host device; associating a first logical block address (LBA) with the first data; storing the first data at a first physical location in a data storage device associated with the first LBA; receiving second data from the host device; associating a second LBA with the second data; storing the second data at a second physical location in the data storage device associated with the second LBA; associating the first LBA with the second LBA to create a LBA group; based, at least in part, on associating the first LBA with the second LBA, determining data recovery information associated with the first LBA and the second LBA, the data recovery information being based, at least in part, on the first data and the second data; associating the data recovery information with the LBA group; and storing the data recovery information and the LBA group. In an example, the data recovery information and the LBA group is stored in the data storage device. In an example, the data recovery information and the LBA group is stored by the host device. In an example, the data recovery information is parity information. In an example, the data recovery information is a combination of hashing information and parity information. In an example, the method also includes detecting a failure associated with the first LBA; based, at least in part, on detecting the failure, accessing the data recovery information associated with the LBA group; and addressing the failure using the data recovery information and the second data associated with the second LBA. In an example, the method also includes receiving updated data associated with the first LBA; and based, at least in part, on receiving the updated data updating the data recovery information associated with the first LBA and the second LBA. In an example, the method also includes determining an operating state of the data storage device; and storing the data recovery information and the LBA group at a particular time associated with the determined operating state of the data storage device. In an example, the data recovery information is stored at a time period associated with a schedule.

Examples also describe a method, comprising: receiving data from a host device; associating a first logical block address (LBA) with the data; storing the data at a first physical location in a data storage device associated with the first LBA, the first physical location being divided into a data section, a first data recovery section and a second data recovery section; determining data recovery information associated with the data; identifying a second LBA associated with the first LBA, the second LBA being associated with a second physical location in the data storage device and being divided into a data section, a first data recovery section and a second data recovery section; and storing a first copy of the data recovery information associated with the data in at least one of the first data recovery section and the second data recovery section associated with the second LBA. In an example, the method also includes identifying a third LBA associated with the first LBA, the third LBA being associated with a third physical location in the data storage device and being divided into a data section, a first data recovery section and a second data recovery section; and storing a second copy of the data recovery information associated with the data in at least one of the first data recovery section and the second data recovery section associated with the third LBA. In an example, the method also includes detecting a failure associated with the first LBA; based, at least in part, on detecting the failure, accessing at least one of the first copy of data recovery information associated with the second LBA and the second copy of data recovery information associated with the third LBA; and addressing the failure using the at least one of the first copy of data recovery information associated with the second LBA and the second copy of data recovery information associated with the third LBA. In an example, the first LBA is logically adjacent to the second LBA. In an example, the data recovery information is parity information. In an example, the data recovery information is a combination of hashing information and parity information. In an example, the data recovery information associated with the data is determined based, at least in part, on the data being written to the data section of the first physical location in the data storage device.

Examples also describe a data storage device, comprising: means for storing data at a first physical location associated with a first logical block address (LBA), the first physical location including a data section, a first data recovery section and a second data recovery section; means for determining data recovery information associated with the data; means for identifying a second LBA associated with the first LBA, the second LBA being associated with a second physical location and including a data section, a first data recovery section and a second data recovery section; and means for storing a first copy of the data recovery information associated with the data in at least one of the first data recovery section and the second data recovery section associated with the second LBA. In an example, the data storage device also includes means for identifying a third LBA associated with the first LBA, the third LBA being associated with a third physical location and including a data section, a first data recovery section and a second data recovery section; and means for storing a second copy of the data recovery information associated with the data in at least one of the first data recovery section and the second data recovery section associated with the third LBA. In an example, the data storage device also includes means for detecting a failure associated with the first LBA; means accessing at least one of the first copy of data recovery information associated with the second LBA and the second copy of data recovery information associated with the third LBA; and means for addressing the failure using the at least one of the first copy of data recovery information associated with the second LBA and the second copy of data recovery information associated with the third LBA. In an example, the data recovery information is at least one of: parity information associated with the data; and a combination of hashing information and parity information associated with the data.

One of ordinary skill in the art will recognize that the technology described herein is not limited to a single specific memory structure, but covers many relevant memory structures within the spirit and scope of the technology as described herein and as understood by one of ordinary skill in the art.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this disclosure that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
   receiving first data from a host device;
   associating a first logical block address (LBA) with the first data;
   storing the first data at a first physical location in a data storage device associated with the first LBA;
   receiving second data from the host device;
   associating a second LBA with the second data;
   storing the second data at a second physical location in the data storage device associated with the second LBA;
   associating the first LBA with the second LBA to create a first LBA group, wherein at least one of the first LBA and the second LBA are part of a second LBA group that is separate from the first LBA group and wherein the second LBA group includes a third LBA that is different from the first LBA and the second LBA;
   based, at least in part, on associating the first LBA with the second LBA, determining first data recovery information associated with the first LBA group, the first data recovery information being based, at least in part, on the first data and the second data;

determining second data recovery information associated with the second LBA group, wherein the second data recovery information is different from the first data recovery information and is based, at least in part, on third data associated with the third LBA and data associated with the at least one of the first LBA and the second LBA;

storing the first data recovery information with the first LBA group; and storing the second data recovery information with the second LBA group.

2. The method of claim 1, wherein the first data recovery information and the first LBA group is stored in the data storage device.

3. The method of claim 1, wherein the first data recovery information and the first LBA group is stored by the host device.

4. The method of claim 1, wherein at least one of the first data recovery information and the second data recovery information is parity information.

5. The method of claim 1, wherein at least one of the first data recovery information and the second data recovery information is a combination of hashing information and parity information.

6. The method of claim 1, further comprising:

detecting a failure associated with the first LBA;

based, at least in part, on detecting the failure, accessing the first data recovery information associated with the first LBA group; and addressing the failure using the first data recovery information and the second data associated with the second LBA.

7. The method of claim 1, further comprising:

receiving updated data associated with the first LBA; and based, at least in part, on receiving the updated data, updating the first data recovery information associated with the first LBA group.

8. The method of claim 1, further comprising:

determining an operating state of the data storage device; and storing the first data recovery information and the first LBA group at a particular time associated with the determined operating state of the data storage device.

9. The method of claim 1, wherein the first data recovery information is stored at a time period associated with a schedule.

10. A method, comprising:

receiving data from a host device;

associating a first logical block address (LBA) with the data;

storing the data at a first physical location in a data storage device associated with the first LBA, the first physical location being divided into a data section, a first data recovery section and a second data recovery section;

determining data recovery information associated with the data;

identifying a second LBA associated with the first LBA, the second LBA being associated with a second physical location in the data storage device and being divided into a data section, a first data recovery section and a second data recovery section; and storing a first copy of the data recovery information associated with the data in at least one of the first data recovery section and the second data recovery section associated with the second LBA.

11. The method of claim 10, further comprising:

identifying a third LBA associated with the first LBA, the third LBA being associated with a third physical location in the data storage device and being divided into a data section, a first data recovery section and a second data recovery section; and storing a second copy of the data recovery information associated with the data in at least one of the first data recovery section and the second data recovery section associated with the third LBA.

12. The method of claim 11, further comprising:

detecting a failure associated with the first LBA;

based, at least in part, on detecting the failure, accessing at least one of the first copy of data recovery information associated with the second LBA and the second copy of data recovery information associated with the third LBA; and addressing the failure using the at least one of the first copy of data recovery information associated with the second LBA and the second copy of data recovery information associated with the third LBA.

13. The method of claim 10, wherein the first LBA is logically adjacent to the second LBA.

14. The method of claim 10, wherein the data recovery information is parity information.

15. The method of claim 10, wherein the data recovery information is a combination of hashing information and parity information.

16. The method of claim 10, wherein the data recovery information associated with the data is determined based, at least in part, on the data being written to the data section of the first physical location in the data storage device.

17. A data storage device, comprising:

means for storing data at a first physical location associated with a first logical block address (LBA), the first physical location including a data section, a first data recovery section and a second data recovery section;

means for determining data recovery information associated with the data;

means for identifying a second LBA associated with the first LBA, the second LBA being associated with a second physical location and including a data section, a first data recovery section and a second data recovery section; and means for storing a first copy of the data recovery information associated with the data in at least one of the first data recovery section and the second data recovery section associated with the second LBA.

18. The data storage device of claim 17, further comprising:

means for identifying a third LBA associated with the first LBA, the third LBA being associated with a third physical location and including a data section, a first data recovery section and a second data recovery section; and means for storing a second copy of the data recovery information associated with the data in at least one of the first data recovery section and the second data recovery section associated with the third LBA.

19. The data storage device of claim 18, further comprising:

means for detecting a failure associated with the first LBA;

means accessing at least one of the first copy of data recovery information associated with the second LBA and the second copy of data recovery information associated with the third LBA; and means for addressing the failure using the at least one of the first copy of data recovery information associated with the second LBA and the second copy of data recovery information associated with the third LBA.

20. The data storage device of claim 17, wherein the data recovery information is at least one of:

parity information associated with the data; and a combination of hashing information and parity information associated with the data.

* * * * *